(12) United States Patent
Hines

(10) Patent No.: US 11,267,437 B2
(45) Date of Patent: Mar. 8, 2022

(54) PARKING BRAKE MECHANISM

(71) Applicant: Paul Rodney Hines, Urbana, OH (US)

(72) Inventor: Paul Rodney Hines, Urbana, OH (US)

( * ) Notice: Subject to any disclaimer, the term of this patent is extended or adjusted under 35 U.S.C. 154(b) by 38 days.

(21) Appl. No.: 16/728,853

(22) Filed: Dec. 27, 2019

(65) Prior Publication Data

US 2020/0216019 A1      Jul. 9, 2020

Related U.S. Application Data

(60) Provisional application No. 62/788,521, filed on Jan. 4, 2019.

(51) Int. Cl.
*B60R 25/08* (2006.01)
*B60T 7/04* (2006.01)
*B60R 25/00* (2013.01)
*E05B 67/38* (2006.01)

(52) U.S. Cl.
CPC ......... *B60R 25/083* (2013.01); *B60R 25/005* (2013.01); *B60T 7/045* (2013.01); *E05B 67/383* (2013.01)

(58) Field of Classification Search
CPC ..... E05B 67/383; B60R 25/005; B60R 25/08; B60R 25/083; B60T 7/045
See application file for complete search history.

(56) References Cited

U.S. PATENT DOCUMENTS

| | | | | |
|---|---|---|---|---|
| 1,318,443 A * | 10/1919 | Gimperling | ........... | B60R 25/005 70/200 |
| 1,388,149 A * | 8/1921 | Friedrich | .............. | B60R 25/005 70/203 |
| 1,550,092 A * | 8/1925 | Morton | ................. | B60R 25/005 70/199 |
| 4,333,326 A * | 6/1982 | Winters | ................ | B60R 25/005 70/203 |
| 5,482,136 A * | 1/1996 | Sorkin | .................. | B60R 25/005 70/202 |
| 5,842,364 A * | 12/1998 | Oliver | ................... | B60R 25/005 70/202 |
| 6,732,556 B1 * | 5/2004 | Russell | ................. | B60R 25/006 70/201 |
| 7,434,428 B1 * | 10/2008 | Carroll | .................. | B60R 25/005 70/200 |
| 7,793,526 B1 * | 9/2010 | Coggins | ................ | B60R 25/006 70/203 |
| 9,475,457 B1 * | 10/2016 | Baynard | ............... | B60R 25/005 |
| 2018/0118162 A1 * | 5/2018 | Rosales | ................. | B60R 25/006 |

* cited by examiner

*Primary Examiner* — Christopher J Boswell
(74) *Attorney, Agent, or Firm* — R. William Graham

(57) ABSTRACT

Parking Brake Mechanism, particularly suited for an All-Terrain Vehicle (ATV) with a security feature is manually engaged by foot or hand and is automatically disengaged by spring action when the ATV operator presses the vehicle brake pedal to shift the transmission lever into "drive". The present invention also allows the operator to secure the vehicle with the parking brake engaged. The vehicle brake mechanism is activated and held on by the parking brake unit; therefore, immobilizing the vehicle.

10 Claims, 9 Drawing Sheets

PARKING BRAKE MECHANISM

BACKGROUND OF THE INVENTION

Field of Invention

This invention relates to parking brakes. More particularly, the invention relates to a parking brake mechanism for all terrain vehicles.

Prior Art

Many all-terrain vehicles (ATVs), use automatic transmissions that have a shift lever that the operator uses to select operating mode and the vehicle relies on the operator to position the shift lever in "park" to immobilize the vehicle. When on level ground this is effective for immobilizing the vehicle; however, should an operator stop the ATV on a slope and position the shift lever into "park" and release the vehicle foot brake, the operator will find it difficult to re-position the shift lever without exerting excessive force on the shift lever causing potential damage to the vehicle transmission or linkage.

Additionally, many all-terrain vehicles (ATVs) have open air cockpits or cabins with no way to secure the vehicle cockpit or cabin. With the ignition key removed, the ATV shift lever can be positioned in "neutral" and the vehicle can be easily moved or towed without the ignition key in the vehicle and without the vehicle engine running.

Prior parking brakes rely on the ATV operator to manually engage a brake handle to hold the pressure on the vehicle brake system on a hill and the ATV operator manually has to disengage the brake handle to release the pressure on the vehicle brake system when the shift lever is positioned to "drive". Additionally, prior parking brakes do not have any indication whether the brake is on or off. Also, prior parking brakes can be easily repositioned from engaged and disengaged positions with no way of securing or locking the parking brake which allows the vehicle to be moved even if the ignition key is removed.

The invention overcomes problems of the prior ATV parking brake devices and enhances security of an ATV through the employment of a unique locking mechanism.

SUMMARY OF INVENTION

It is a principal object of the invention to provide an improved parking brake mechanism for an all terrain vehicle.

Another object of the invention is to provide an anti theft security feature in an attachment to a brake for an all terrain vehicle.

Another object of the invention is to provide a foot operated locking mechanism to engage a brake of an all terrain vehicle into a locked position.

Another object of the invention is to provide an attachment for an all terrain vehicle parking brake that is easy to install as an after market item.

Accordingly, the invention is directed to a parking brake mechanism for an all terrain vehicle providing an improved parking brake and security feature to a brake pedal of a vehicle, particularly, an all terrain vehicle. The mechanism includes a rigid bracket mountable about a vehicle brake pedal. In this regard, the bracket includes at least one mounting surface mounted to a fixed surface adjacent the brake pedal.

The bracket is provided with a locking pin mechanism which is attached thereto in a manner to normal bias the pin in a relaxed open state, and when the bracket is mounted about the brake pedal, the brake pedal can be depressed to a braking position whereupon so doing permits actuation of the locking pin to be moved into a blocking position and when the brake pedal is released a brake pedal arm connected to the brake pedal engages the locking pin preventing the brake from being fully released and thus preventing the movement of the vehicle. Further, the locking pin is provided with lateral stop surfaces, e.g., bushings which rest on either side of contacting brake pedal arm to aid in maintaining the brake arm in place.

Additionally, there is provided a locking arm which is connected to the locking pin and includes a locking surface which is complementary to a locking surface on the bracket and to which a locking member can be attached to both to secure the brake pedal in a secure way such that without removal of the locking member, the pin remains engaged in a secure manner.

When the locking member is not in use, the present invention provides a parking brake mechanism which permits manually engagement by foot or hand and is automatically disengaged by spring action of the when the vehicle, i.e., ATV, operator presses the vehicle brake pedal. The present invention allows the operator to secure the vehicle with the parking brake engaged. The invention therefore provides a vehicle brake attachment mechanism which is deployed on by the vehicle brake to immobilize the vehicle as well as provide an anti-theft aspect.

DETAILED DESCRIPTION OF PREFERRED EMBODIMENT

Figure 1:
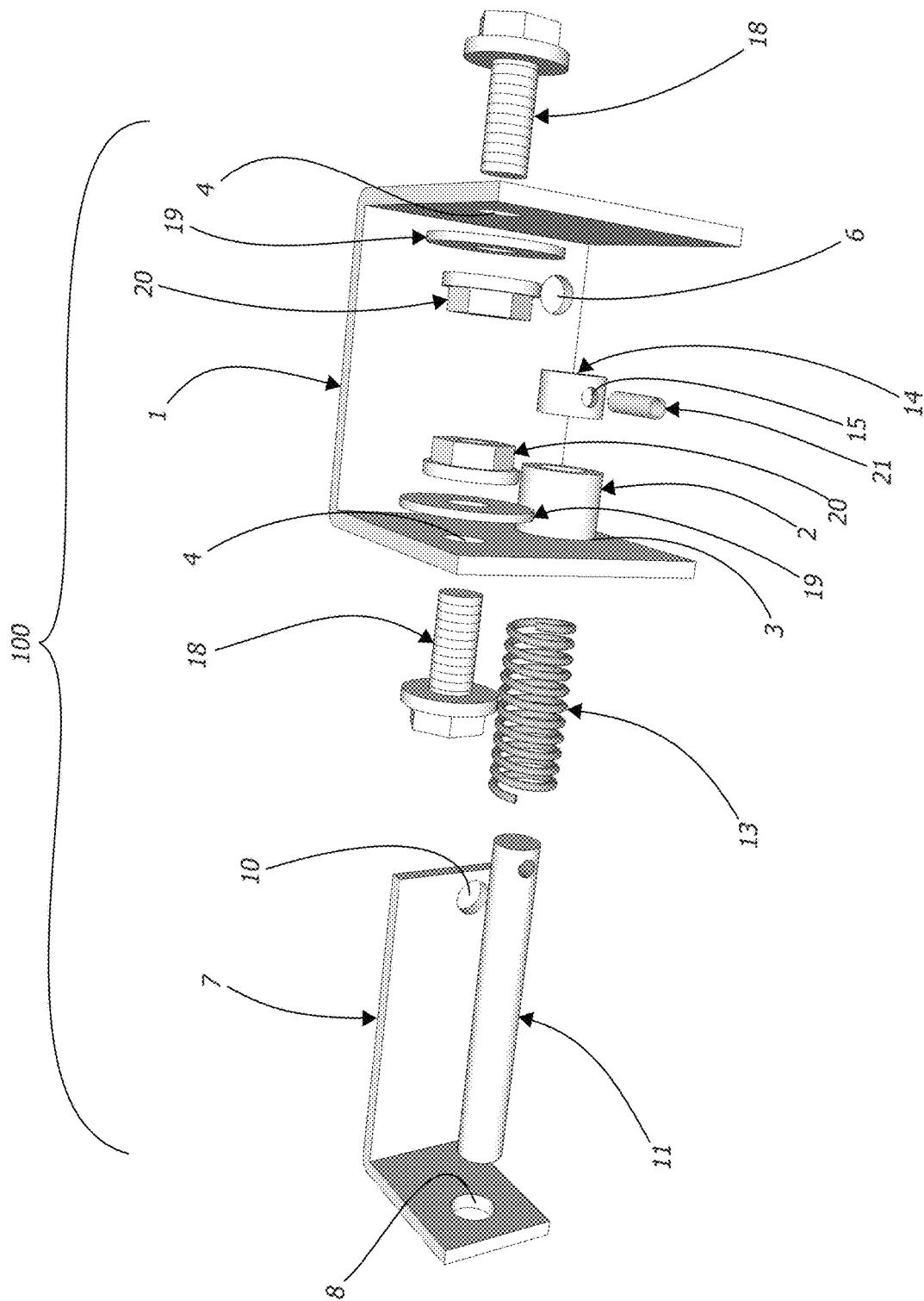
FIG. 1 is a back side exploded perspective view of an embodiment of the invention.
Figure 2:
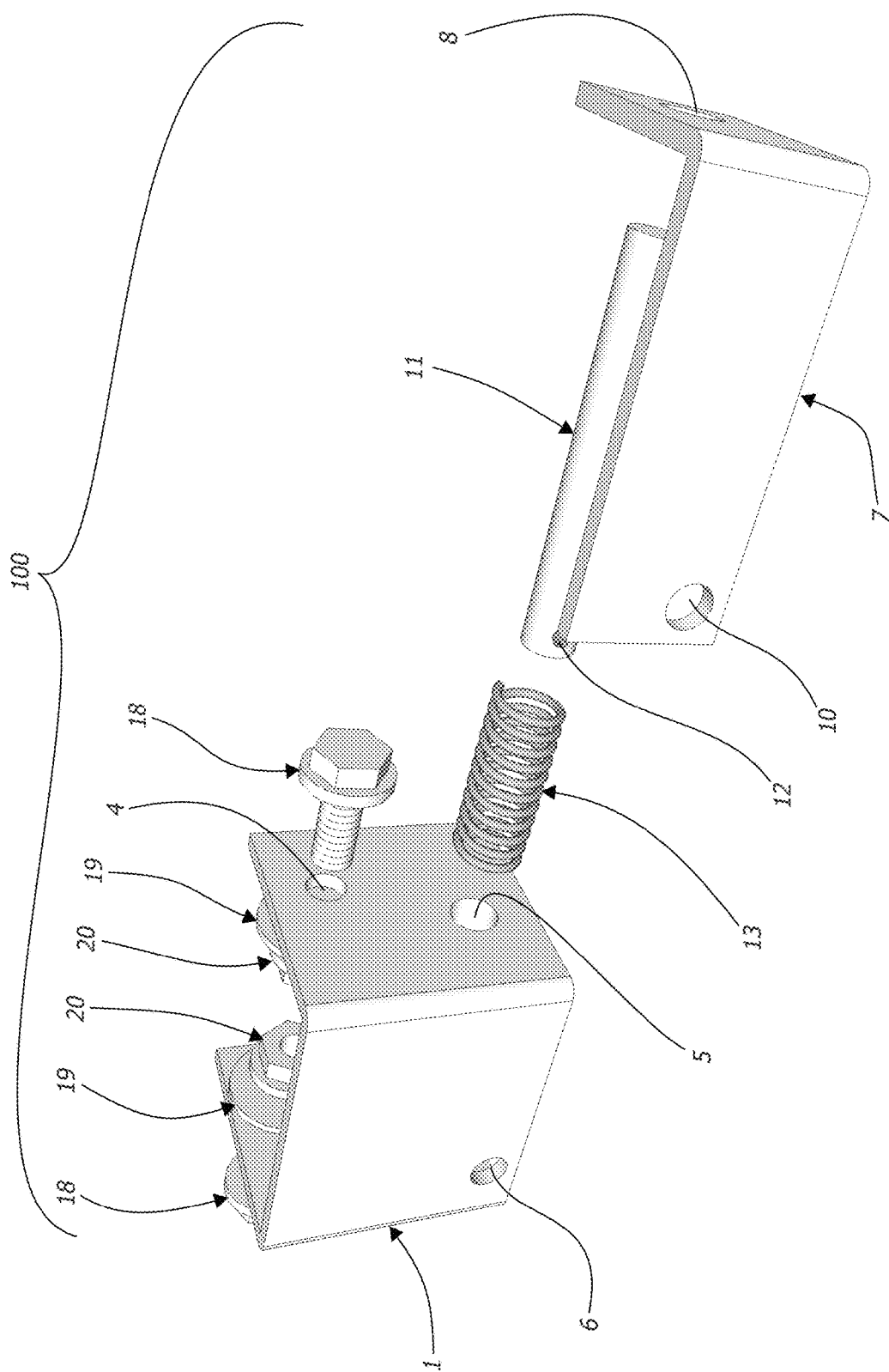
FIG. 2 is a front side exploded perspective view of an embodiment of the invention.
Figure 3:
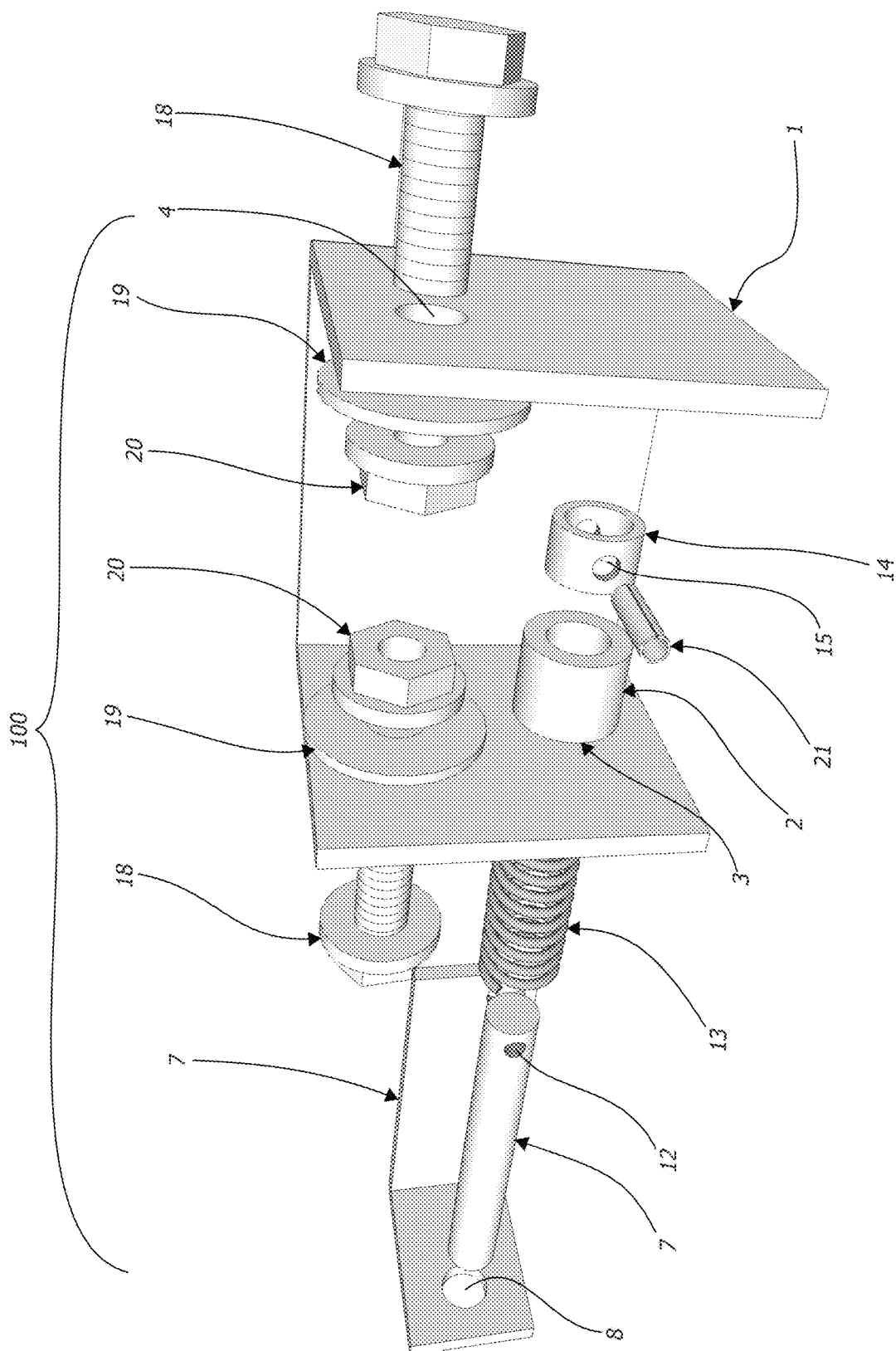
FIG. 3 is another back side exploded perspective view of an embodiment of the invention.

Referring to the drawings, the present invention is directed to a parking brake mechanism which is generally designated by the numeral 100. Like numbers refer to like parts within the drawings. The mechanism 100 is for use on a vehicle, such as an all terrain vehicle (ATV) providing an improved parking brake and security feature to a pedal brake of a vehicle (not shown). The mechanism 100 includes a rigid bracket 1 mountable about a vehicle brake pedal, such as to a vehicle brake pedal bracket 17. In this regard, the bracket 1 includes at least one mounting surface mounted (mounting holes 4) to a fixed surface (vehicle brake pedal bracket 17 having holes 22 therein which are complementary aligned to holes 4) adjacent the brake pedal.

The bracket 1 is provided with a locking pin mechanism 120 which is attached thereto in a manner to normal bias a slide pin 11 in a relaxed open state, and when the bracket 1 is mounted about the brake pedal bracket 17, the brake pedal 24 can be depressed to a braking position whereupon so doing permits actuation of the locking pin 11 to be moved into a blocking position and when the brake pedal is released a brake pedal arm 16 connected to the brake pedal engages the locking pin 11 preventing the brake from being fully released and thus preventing the movement of the vehicle. Further, the locking pin 11 is provided with lateral stop surfaces 2 and 14, e.g., bushings, which rest on either side of contacting brake pedal arm 16 to aid in maintaining the brake pedal arm 16 in place.

Figure 9:
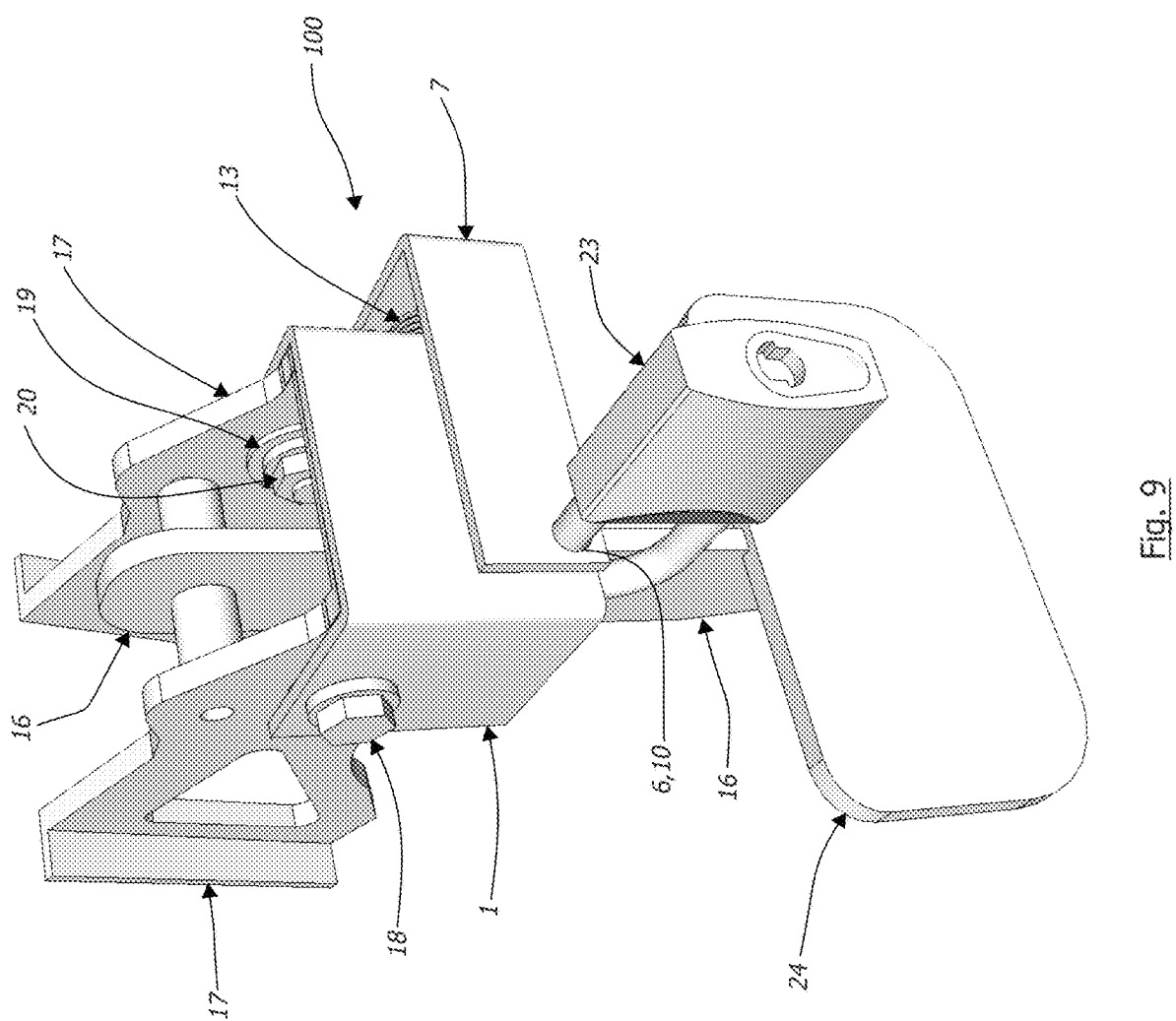
FIG. 9 is a front perspective of the invention deployed on a parking brake of a vehicle in a biased engaged position.

Additionally, there is provided a locking arm 7 which is connected to the locking pin 11 and includes a locking surface 10 which is complementary alignable to a locking surface 6 on the bracket 1 and to which a locking member 23 (FIG. 9) can be attached to both to secure the brake pedal in a secure way such that without removal of the locking member, the pin 11 remains engaged in a secure manner.

When the locking member is not in used, the present invention provides a parking brake mechanism which permits manually engagement by foot or hand and is automatically disengaged by spring action of the when the vehicle, i.e., ATV, operator presses the vehicle brake pedal. The present invention allows the operator to secure the vehicle with the parking brake engaged. The invention therefore provides a vehicle brake attachment mechanism 100 which is deployed on by the vehicle brake to immobilize the vehicle as well as provide an anti-theft aspect.

Now in more particular detailed description as to features and benefits, these are set forth below. Many all-terrain vehicles (ATVs), use automatic transmissions that have a shift lever that the operator uses to select operating mode and the vehicle relies on the operator to position the shift lever in "park" to immobilize the vehicle. When on level ground this is effective for immobilizing the vehicle; however, should an operator stop the ATV on a slope and position the shift lever into "park" and release the vehicle foot brake, the operator will find it difficult to re-position the shift lever without exerting excessive force on the shift lever causing potential damage to the vehicle transmission or linkage.

Additionally, many all-terrain vehicles (ATVs) have open air cockpits or cabins with no way to secure the vehicle cockpit or cabin. With the ignition key removed, the ATV shift lever can be positioned in "neutral" and the vehicle can be easily moved or towed without the ignition key in the vehicle and without the vehicle engine running. The invention claimed here solves this problem.

The present invention addresses these problems by providing a parking brake unit that is manually engaged by the foot or hand holding the vehicle brake pedal in the engaged position. The parking brake unit is automatically disengaged by spring action when the ATV operator presses the vehicle brake pedal to shift the transmission lever into "drive". The present invention addresses the security problem by allowing the ATV operator to lock the parking brake unit in the engaged position. By holding the pressure on the vehicle brake system, the vehicle will not be easily moved even when the shift lever is positioned in the "neutral" position.

The claimed invention differs from what currently exists. The present invention can be easily installed on the factory brake bracket or cabin wall and is small with one moving assembly or linkage. The present invention is manually engaged by the operator when required, but automatically disengages when the operator presses the vehicle brake pedal to position the shift lever to "drive". The action of pressing the brake pedal to position the shift lever into "drive" is the recommended practice listed in the vehicle operating manual. Additionally, the present invention allows for the ATV operator to secure the vehicle by allowing the parking brake to be locked in the engaged position, preventing the vehicle to be moved.

This invention is an improvement on what currently exists. The present invention can be easily installed on the factory brake bracket and is small with one moving assembly or linkage. The present invention is manually engaged by the operator when required, but automatically disengages when the operator presses the vehicle brake pedal to position the shift lever to "drive. Additionally, the present invention allows for the ATV operator to secure the vehicle by allowing the parking brake to be locked in the engaged position, preventing the vehicle to be moved.

Prior parking brakes rely on the ATV operator to manually disengage the parking brake. If the ATV operator unintentionally does not manually disengage the brake handle, places the vehicle shift lever in "drive", and operates the vehicle with the parking brake is engaged, damage to the vehicle brake system or transmission may occur.

The present invention addresses these problems by providing a parking brake system that is manually engaged by foot or hand and is automatically disengaged by spring action when the ATV operator presses the vehicle brake pedal to shift the transmission lever into "drive". The present invention also allows the operator to secure the vehicle with the parking brake engaged. The vehicle brake system is activated and held on by the parking brake unit; therefore, immobilizing the vehicle.

Exemplary Version of the Invention Discussed Here Includes Part Number Followed by Part Description 1. Bent metal mount bracket, 0.125 inches thick, sized to fit factory mounting location and holes
2. Metal slide bushing 0.380 inches inside diameter, 0.625 inches outside diameter and 0.50 inches on length
3. Slide bushing weld, 0.1875 inches fillet weld, partial to limit interference with factory bracket
4. Mounting hole 0.3150 inches diameter located to match factory hole in brake bracket
5. Slide pin hole 0.380 inches diameter located to match slide bushing
6. Body lock hole 0.3125 inches diameter located to match action arm lock hole in engaged position
7. Bent metal action arm 4.5 inches long, 1.0 inches tall, 0.125 inches thick
8. Slide pin mount hole, 0.375 inches diameter located to match slide pin
9. Slide pin weld, 0.1875 inches fillet weld
10. Action Arm lock hole, 0.3125 inches diameter located to match body lock hole in engaged position
11. Metal slide pin, 0.375 inches diameter, 2.75 inches long
12. Slide pin roll pin hole, 0.1565 inches diameter located to match stop bushing hole
13. Spring, Compression spring, 1.75 inches long, 0.50 inches outside diameter, 0.054 WG 14. Metal stop bushing, 0.380 inside diameter, 0.50 inches outside diameter, 0.3130 inches long
15. Stop bushing roll pin hole, 0.1565 inches diameter located to match slide pin hole
16. Vehicle brake pedal arm, factory brake pedal engages vehicle hydraulic brakes
17. Vehicle brake pedal bracket, factory bracket holds brake pedal
18. Mount bolt, flange bolt, M8×16-1.25 pitch
19. Mount washer, fender washer, 0.3125×1.25 inches
20. Mount nut, M8 flange nut—1.25 pitch
21. Roll pin, roll pin 0.15625 inches, 0.50 inches long
22. Factory Mounting hole 0.3150 inches diameter
23. Locking member—Pad Lock
24. Vehicle Brake Pedal Relationship Between the Components in an Exemplary Embodiment (FIG. 1, 2, 3) Slide Bushing (2) is welded (3) to mount bracket (1) and aligned with the slide pin hole (5) in the mount bracket (1). Slide Pin (11) is inserted through slide pin hole (8) in action arm (7) and slide pin roll pin hole (12) (identify in FIG. 1) is oriented in a perpendicular direction front of action arm (7), and slide pin (11) is inserted through slide pin hole (8) and full fillet welded (9) to action arm (7).

Action arm (7) with connected slide pin (11) has a spring (13) inserted over slide pin (11). Slide pin (11) engages mount bracket (1), by insertion of slide pin (11) through mount bracket slide pin hole (5) and slide bushing (2) with the spring (13) remaining in a biased position between L shaped action arm (7) and bracket (1). A stop bushing (14) is inserted on an end of slide pin (11) with stop bushing roll pin hole (15) aligned with slide pin roll pin hole (12). Roll pin (21) inserted in stop bushing roll pin hole (15) and slide pin roll pin hole (12) to fix position thereof. Stop bushing (14) prevents slide pin (11) and action arm (7) and spring (13) disconnecting from mount bracket (1) and slide bushing (2).-

This part of the unit is installed on vehicle with mounting bolts (18) inserted through mount holes (4) and through factory hole (22) (shown in FIGS.) in vehicle brake pedal bracket (17), each bolt (18) with mount washer (19) installed on back side of vehicle brake pedal bracket (17) and mount nut (20) installed and tightened.

How the Invention Works

Figure 4:
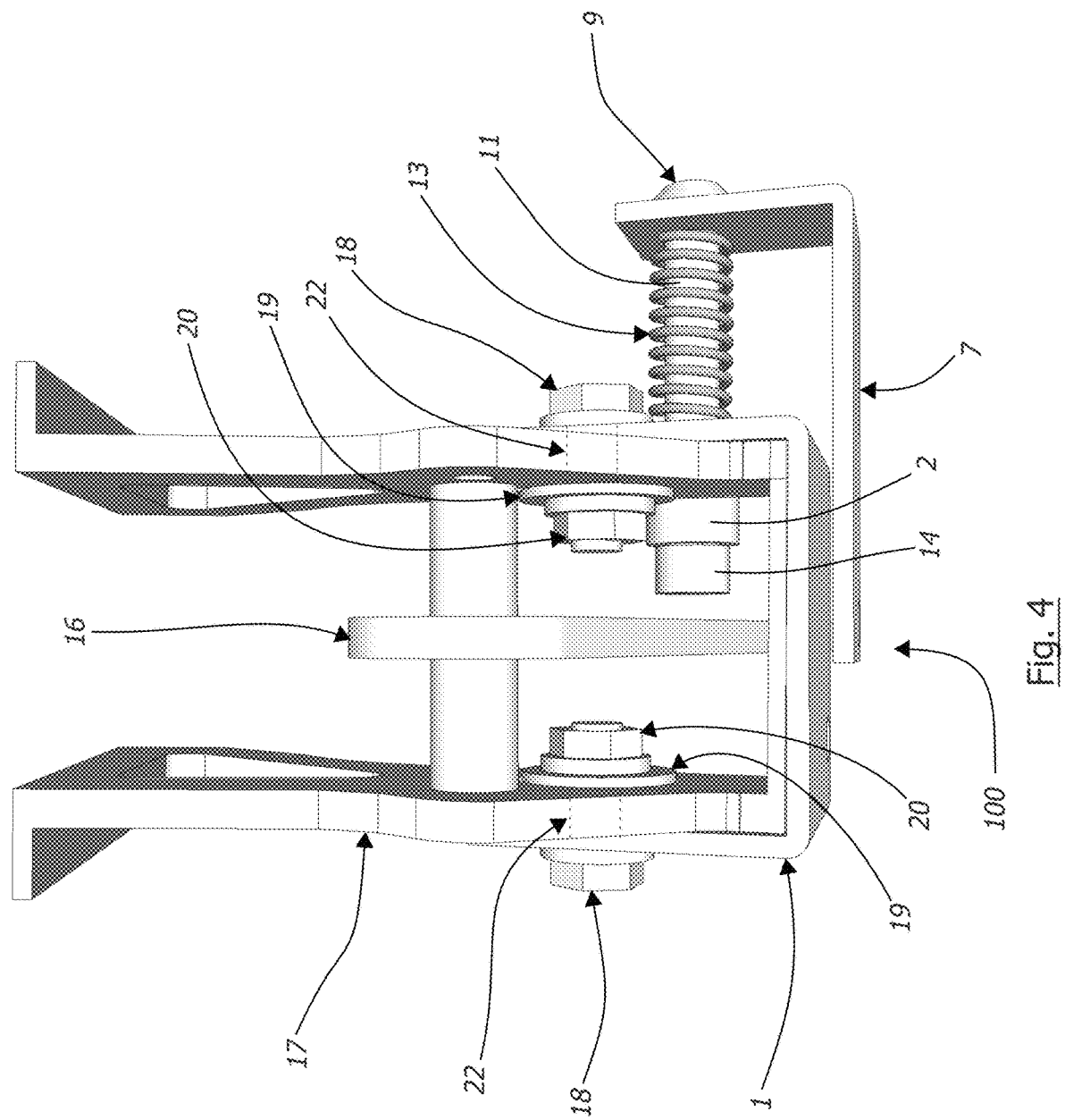
FIG. 4 is a top perspective of the invention deployed on a parking brake of a vehicle in a relaxed non engaged position.
Figure 5:
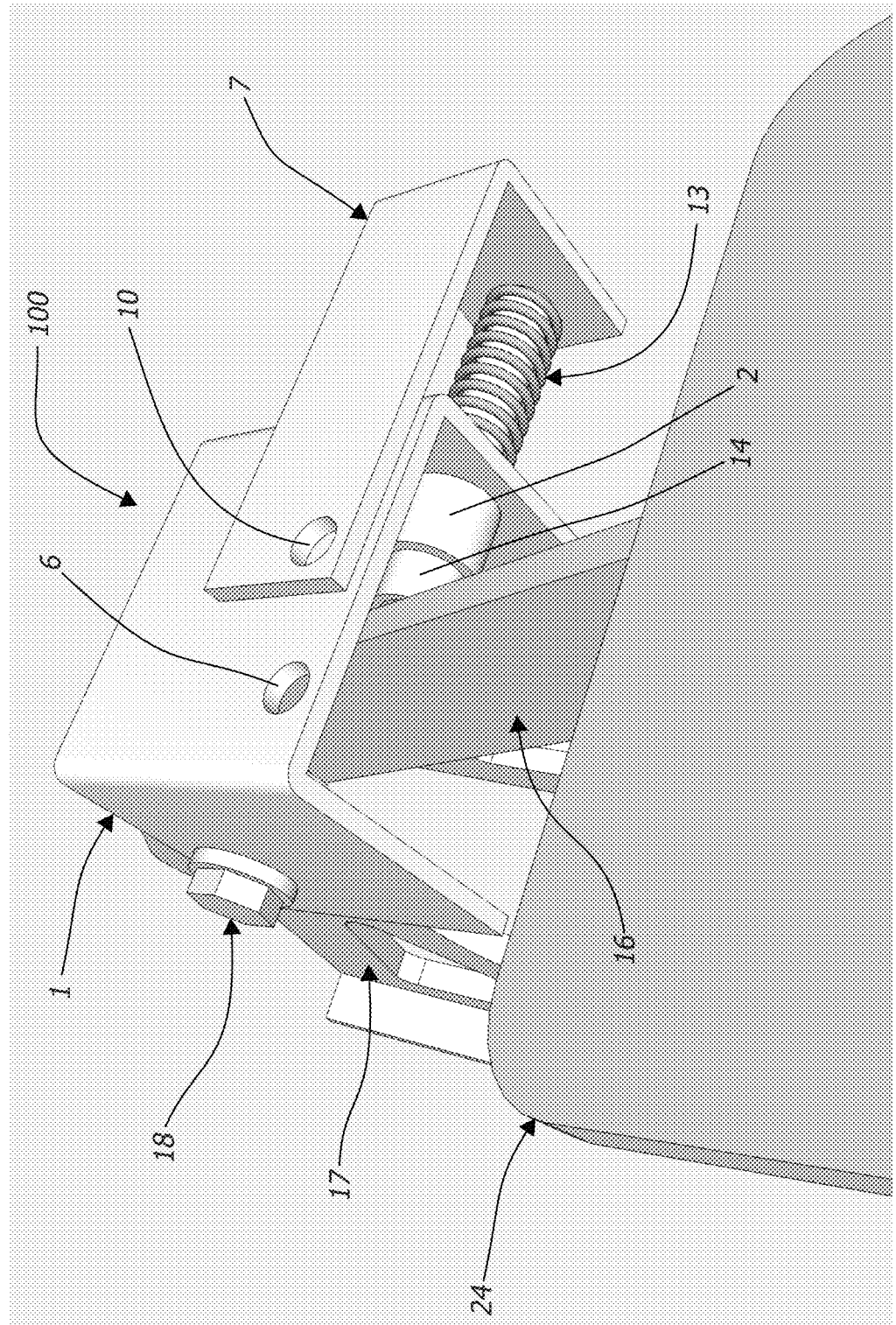
FIG. 5 is a bottom perspective of the invention deployed on a parking brake of a vehicle in a relaxed non engaged position.
Figure 6:
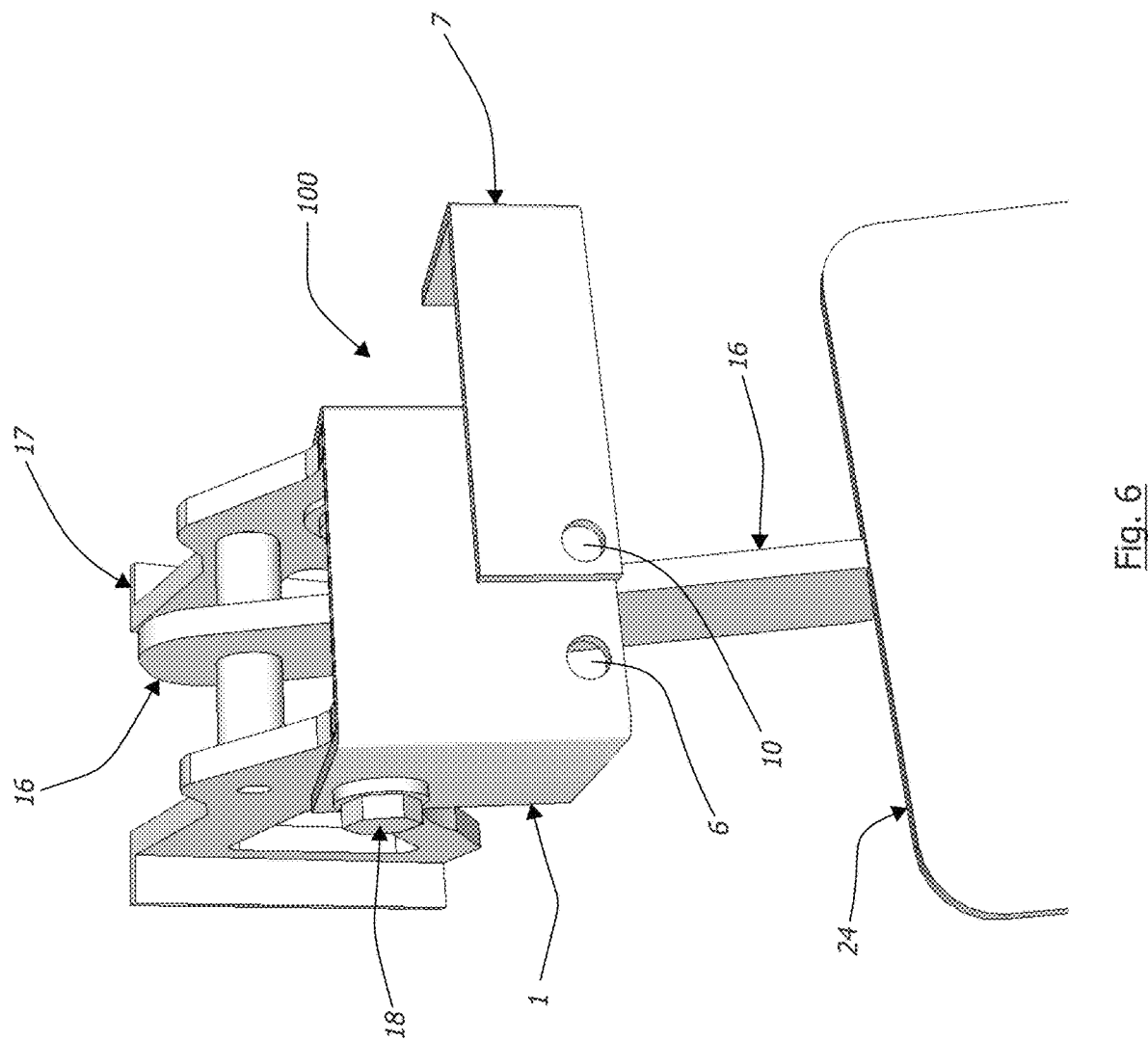
FIG. 6 is a front perspective of the invention deployed on a parking brake of a vehicle in a relaxed non engaged position.
Figure 7:
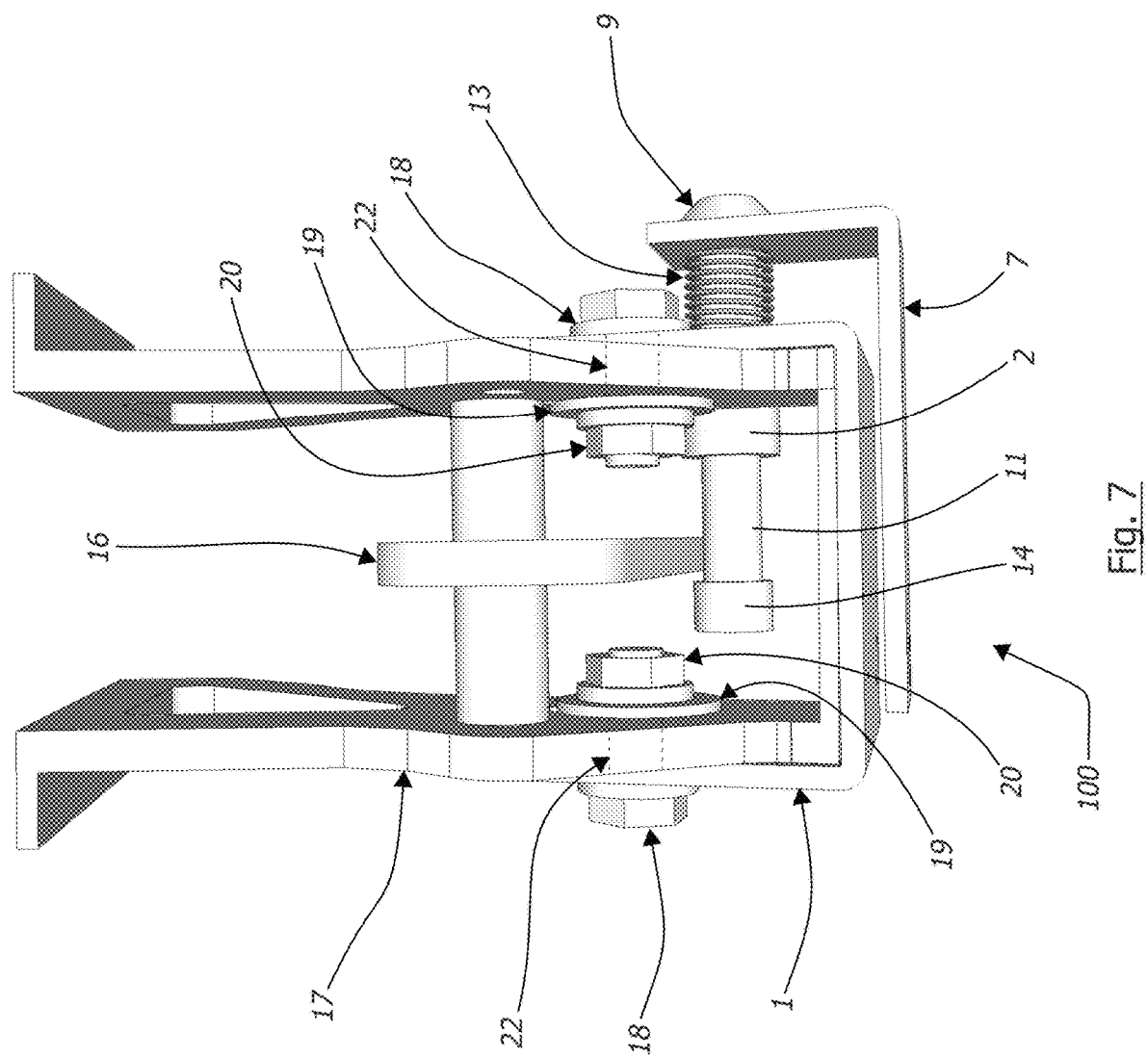
FIG. 7 is a top perspective of the invention deployed on a parking brake of a vehicle in a biased engaged position.
Figure 8:
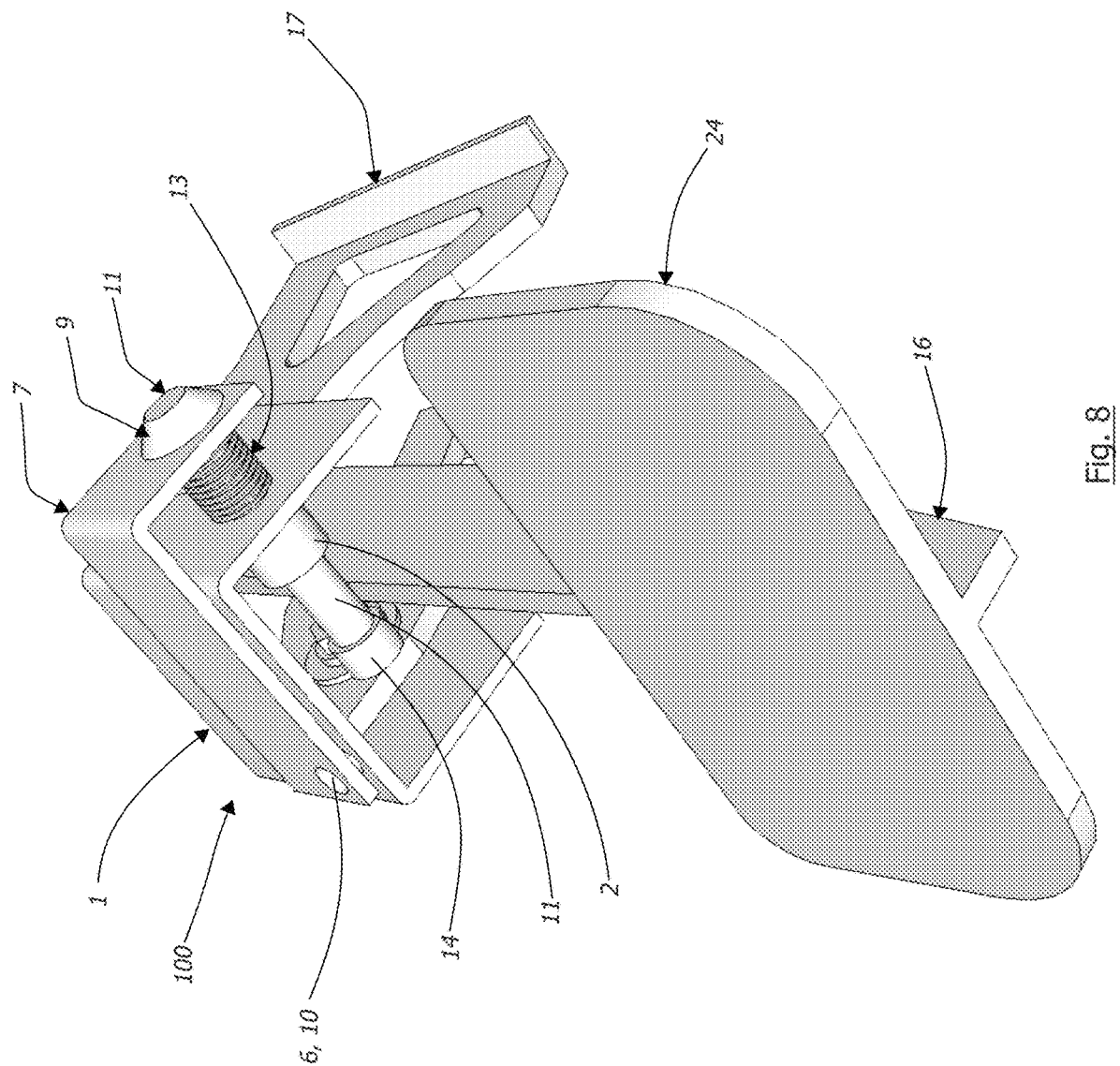
FIG. 8 is a bottom perspective of the invention deployed on a parking brake of a vehicle in an increased biased engaged position.

With the parking brake mechanism (100) installed on the vehicle brake pedal bracket (17), vehicle brake pedal arm (16) is pressed to activate the vehicle brake system. With vehicle brake pedal arm (16) depressed, the operator pushes the action arm (7) with force to the direction of the vehicle brake pedal arm (16), with engaging slide pin (11) through the slide bushing (2) and compresses the spring (13) in increased biased manner. With operator foot force acting on the action arm (7) operator releases force on the vehicle brake pedal arm (16) and contacts the slide pin (11) thereby holding the vehicle brake pedal in engaged or "ON" position by frictional force (FIG. 7, 8). Operator positions the vehicle shift lever to "park" and no vehicle roll weight or binding forces are applied upon the transmission or linkage. Operator may exit vehicle cockpit. Operator enters the vehicle, starts manufacturer's recommended operational practices to drive, first presses vehicle brake pedal and arm (16) where frictional force is removed on slide pin (11) and sufficient to permit the stop bushing (14) to pass thereby, and slide pin (11) and bushing (14) retract by force of spring (13) which decompress and disengage slide pin (11) and action arm (7) automatically (FIG. 4, 5). The slide pin (11) is in the disengaged position and vehicle brake pedal arm (16) moves freely with no involvement of slide pin (11) (FIG. 5).

Additionally, if the operator would like to prevent and secure the movement of the vehicle, with action arm (7) in the engaged position the operator may insert a locking member (23) such as a pad lock shaft through mount bracket lock hole (6) and action arm lock hole (10) (FIG. 9), pad lock shaft prevents the movement of action arm (7) and slide pin (11), with vehicle brake pedal arm (16) engaged and vehicle brake system engaged and action arm (7) locked the vehicle is immobilized even if the shift lever is positioned to "neutral", securing the vehicle from unwanted movement, thus providing an anti-theft mechanism How to Make the Invention (FIG. 1, 2, 3) To make the parking brake mechanism (100), one can use flat A-36 metal bar stock 2.0 inches wide×6.25 inches long×0.125 inches thick, to create the mount bracket (1). The mount bracket (1) has two bends required to match the vehicle brake pedal bracket (17). By example, a first bend is located 2" along the length and is required to be ninety degrees, a second bend is located 2 inches along the length measured from the opposing end of the flat stock, and this bend is ninety degrees. These two bends are created on a hydraulic press break with tooling to create and hold the ninety degree angles. The final shape of mount bracket (1) is a generally CU' shape measuring about 2 inches outside dimension deep×2.5 inches outside dimension wide×2 inches outside dimension tall. Four machined drilled through holes are required in the mount bracket (1). A first hole is the slide pin hole (5) located on the face of the right side 2 inch leg, the center of the 0.380 inch diameter through hole is located 1.125 inches perpendicular to the end 2.0 inch edge and 0.5 inches perpendicular to the bottom 2.0 inch edge. A second hole is the mount hole (4) on the right side 2 inch leg, the center of the 0.3150 diameter through hole located 0.6938 inches perpendicular to the end 2.0 edge and 0.4375 inches perpendicular to the top 2.0 inch edge. A third hole is the other mount hole (4) on the left side 2 inch leg, the center of the 0.3150 diameter through hole located 0.6938 inches perpendicular to the end 2.0 edge and 0.4375 inches perpendicular to the top 2.0 inch edge. A fourth hole is the mount bracket lock hole (6) on the front 2.5 inch×2.0 inch face, the center of the 0.3125 diameter through hole is located 0.25 inches perpendicular to the bottom 2.25 inch edge and 0.5563 inches perpendicular to the left 2.0 inch edge or leg face.

A slide bushing (2) is created from a 0.625 inch outside diameter×0.249 inch interior diameter×0.188 inch wall×0.50 inch long A-36 steel tube bushing. An interior diameter is required to be machine drilled through the length to create a 0.380 inch interior diameter. The bushing now 0.625 inch outside diameter×0.380 inch interior diameter×0.1225 inch wall×0.50 inch long shall be placed with the 0.50 length dimension perpendicular to interior face the right 2.0 inch leg and align the interior diameter of 0.380 inch with the slide pin hole (5), a jig pin is then clamped through the slide pin bushing (2) to hold the bushing in alignment with the slide pin hole (5). A 0.1875 inch fillet weld (3) is placed around the base of the slide pin bushing (2) welding the slide pin bushing (2) to the interior face of the right 2.0 inch leg.

A slide bushing weld (3) will start looking at the interior side of the bushing 45 degrees from top dead center and stop 248 degrees from to dead center.

By way of example, the mount bracket (1) is sized to fit the Honda Pioneer 1000 or Honda Talon model series brake pedal bracket (17). Other embodiments of the mount bracket (1) with minor changes to dimensions and mount location would allow the mount bracket (1) to fit other ATV vehicles such as Can Am, Polaris, Textron, Yamaha, Kawasaki and Arctic Cat. Action arm (7) is flat A-36 metal bar stock 1.0 inch wide×4.375 inches long×0.125 inches thick. The action arm (7) has one bend required, a bend is located 1.5 inches along the length and from one end, and the bend is ninety degrees. This bend is created on a hydraulic press break with tooling to create and hold the ninety degrees angle. Final shape of action arm (7) is 3.0 inches outside dimension long×1.5 inches outside dimension deep×1.0 inches tall. Two machine drilled through holes are required in the action arm (7). The first hole is the slide pin mount hole (8) located on the face of the 1.5 inches leg, the center of the 0.380 inch diameter through hole is located 0.5 inches perpendicular to the 1.5 inch edge and 0.425 inches perpendicular to the 1.0 inch edge. The action arm lock hole (10) is located on the face of the 3.0 inch leg, the center of the 0.3125 inch diameter through hole is located 0.25 inches from the 3.0 inch edge and 0.25 inches from the 1.0 inch edge. The slide pin (11) is creates from 0.375 inch diameter A-36 hot rolled steel bar stock cut to 2.75" long. One machine drilled through hole is required in the slide pin (11). The slide pin roll pin hole (12) is 0.150 inch diameter and is located 0.1565 inches from the end of the slide pin (11) and is crossed drilled through the center of the slide pin. To create the action arm assembly, the action arm (7) and the slide pin (11) shall be assembled by inserting the end of the slide pin (11) without the slide pin roll pin hole (12) through the slide pin hole mount hole (8) in the action arm (7) 1.5 inch leg. The slide pin (11) shall penetrate through the slide pin mount hole (8) a dimension of 0.2089 inches. The slide pin (11) shall be parallel to the interior face the 3.0 inch leg and the slide pin roll pin hole (12) shall be oriented as such the hole is perpendicular to the 3.0 inch leg. The slide pin (11) welded to the action arm (7) with a 0.1875 inch fillet weld 360 degrees around the joint of the slide pin (11) and the face of the action arm (7) 1.5 inch leg. Stop bushing (14) is created from 0.50 outside diameter×0.375 inch interior diameter×0.0625 inch wall A-36 steel tube cut to 0.3130 inch long. One machine drilled through hole is required in the stop bushing (14). The stop bushing roll pin hole (15) is 0.150 inch diameter and is located 0.1565 inches from the end of the stop bushing (14) and is crossed drilled through the center of the slide pin. Action arm assembly and mount bracket assembly and stop bushing shall have a corrosion resistant and wear resistant finish added prior to final assembly. Final assembly is completed by taking the action arm assembly and adding a manufactured compression spring (13), e.g., #12 spring with dimension of 0.50 inch outside diameter×1.75 inch long, 0.054 wire gauge. Spring (13) shall be installed over the slide pin (11) and then the action arm assembly with spring installed on the slide pin (11) shall be inserted through the right 2.0 inch leg of the mount bracket, slide pin (11) shall be inserted through the slide pin mount hole (5) and slide bushing (2) compressing the spring (13) slightly, allowing the end of the slide pin (11) to penetrate the interior side of the slide bushing and exposing the slide pin roll pin hole (12). With slide pin roll pin hole (12) exposed the stop bushing (14) shall be installed over the end of the slide pin (11) and the stop bushing roll pin (15) aligned with the slide pin roll pin hole (12) a manufactured 0.15625 inch roll pin (21) can be inserted through the stop bushing (14) and the slide pin (11). With the stop bushing (14) installed and retained on to the end of the slide pin (11) by the roll pin (21), the action arm assembly is installed the final assembly is completed.

The required elements are the mount bracket (1), slide bushing (2), slide bushing weld (3), mounting hole (4), slide pin hole (5), action arm (7), slide pin mount hole (8), slide pin weld (9), slide pin (11), slide pin roll pin hole (12), spring (13), mount bolt (18), mount washer (19), mount nut (20). Optional elements are the body lock hole, (6), action arm lock hole (10), stop bushing (14), stop bushing roll pin hole (15), and roll pin (21), The body lock hole (6) and the action arm lock hole (10) can be eliminated if a non-locking embodiment is required. The stop bushing (14) can eliminated and replaced with only the roll pin (21) or a M4×16-70 pitch threaded cap screw and M4 nylon locking nut either of these elements could be used to retain the slide pin (11) and keep it from being retracted through the slide bushing (2) by the force of the compression spring (13).

This embodiment uses the operator's right foot to engage the parking brake, while the left foot holds the brake pedal, which is a standard practice when driving an ATV on a hill. The operator uses their right foot on the accelerator pedal and left foot on the on the brake to prevent rolling backwards or forwards once the accelerator pedal is released. The entire unit could be mirrored to the left side of the vehicle brake assembly which would require the left foot or a hand to engage the parking brake.

How to Use the Invention

This embodiment of the aftermarket parking brake is installed in the factory holes on the Honda Pioneer 1000 or Honda Talon models factory brake pedal bracket. The operator of the all-terrain vehicle (ATV) would use this invention to hold the vehicle on a sloping grade, where the weight of the ATV adds addition force on the ATV transmission and linkage. The additional force placed on the ATV transmission can put it in a binding position. To use the invention the operator of the ATV would complete normal operating procedures to stop the vehicle on a sloping grade. To stop the vehicle on sloping grade the operator would press the vehicle brake pedal with their left foot and hold the brake pedal; therefore, activating the vehicle brake system.

The vehicle brake system will hold the vehicle weight. Using the operator's right foot the operator forces the action arm of the parking brake to the engaged position (FIG. 7, 8, 9). While holding force on the action arm with the operator's right foot the operator can release the pressure on the brake pedal and the action arm assembly will hold the vehicle brake pedal in the engaged position. Next, the operator will need to place the vehicle shift lever in the "park" position. When the operator is ready to "drive" the vehicle, the operator presses the vehicle brake pedal, which automatically releases the parking brake as it slides to the disengaged position (FIG. 4, 5, 6). The operator, while still pressing the vehicle brake pedal, repositions the vehicle shift lever to "drive". This can be completed with normal force because the vehicle weight is being held by the vehicle brake system. Finally, the operator can release the brake pedal and begin operating the vehicle. The operator of the all-terrain vehicle (ATV) can also secure the vehicle and deter theft by stopping the vehicle and engaging this parking brake invention. As described prior, in the engaged position the operator can insert a removable lock with a shackle that can pass through the locking holes on the action arm and mount bracket lock holes (FIG. 9); therefore, securing this parking brake invention in the engaged position and deterring movement of the vehicle.

It is to be understood that the terms used herein are merely descriptive rather than limiting and that various changes, numerous equivalents may be made without departing from the spirit or scope of the claimed invention.

What is claimed is:

1. A parking brake mechanism for a vehicle having a brake having a brake pedal with a brake pedal arm, which includes:
   a rigid bracket mountable about the vehicle brake and having at least one mounting surface configured for mounting to a fixed surface adjacent the brake; and
   a hand and foot actuated locking pin mechanism connected to said rigid bracket having a biasing member to normally bias a pin transversely disposed relative to the brake pedal arm into a relaxed open state to permit actuation of the brake pedal arm thereby, and when said bracket is mounted about the brake, the brake pedal can be depressed to a braking position to movably pass the brake arm by said locking pin and upon so doing permits actuation of said locking pin to be moved into a blocking position wherein said locking pin includes lateral a stop surface disposed on said locking pin, such that when said locking pin is contacting the brake pedal arm, said stop surface aids in maintaining the brake arm and locking pin in place preventing the brake from being fully released and thus preventing the movement of the vehicle wherein said locking pin is characterized to include two lateral stop surfaces disposed in a spaced relation on said locking pin, such that when said locking pin is contacting the brake pedal arm, said stop surfaces are disposed either side thereof to aid in maintaining the brake arm and locking pin in place.

2. The parking brake mechanism of claim 1, which further includes a locking arm connected to said locking pin and includes a locking surface which is complementary alignable to a locking surface on said rigid bracket and to which a locking member can be attached to both locking surfaces to secure the brake in a secure way such that without removal of said locking member, said locking pin remains engaged in a secured manner.

3. The parking brake mechanism of claim 2, wherein said locking surfaces include a bored surface in said bracket and a bored surface in said locking arm.

4. The parking brake mechanism of claim 1, wherein said rigid bracket includes a bored surface to slidably receive said locking pin therethrough.

5. The parking brake mechanism of claim 4, wherein said biasing member includes a spring disposed about said locking pin.

6. The parking brake mechanism of claim 5, wherein said spring is retained external to said bracket.

7. The parking brake mechanism of claim 1, wherein said mounting surface of said rigid bracket includes at least one bored surface complementary configured to a brake pedal bracket having at least one bored surface and said mechanism includes at least one threaded bolt to be received through said bored surfaces and connect to a threaded surface to lock said mounting surface to said brake pedal bracket.

8. The parking brake mechanism of claim 7, wherein said threaded surface is within a threaded nut.

9. The parking brake mechanism of claim 1, wherein said rigid bracket includes at least one bend providing surfaces adjacent to each other at a predetermined angle, one of which includes said mounting surface.

10. The parking brake mechanism of claim 9, wherein said mounting surface of said rigid bracket includes at least one bored surface complementary configured to a brake pedal bracket having at least one bored surface and said mechanism includes at least one threaded bolt to be received through said bored surfaces and connect to a threaded surface to lock said mounting surface to said brake pedal bracket.

* * * * *